Patented Sept. 29, 1925.

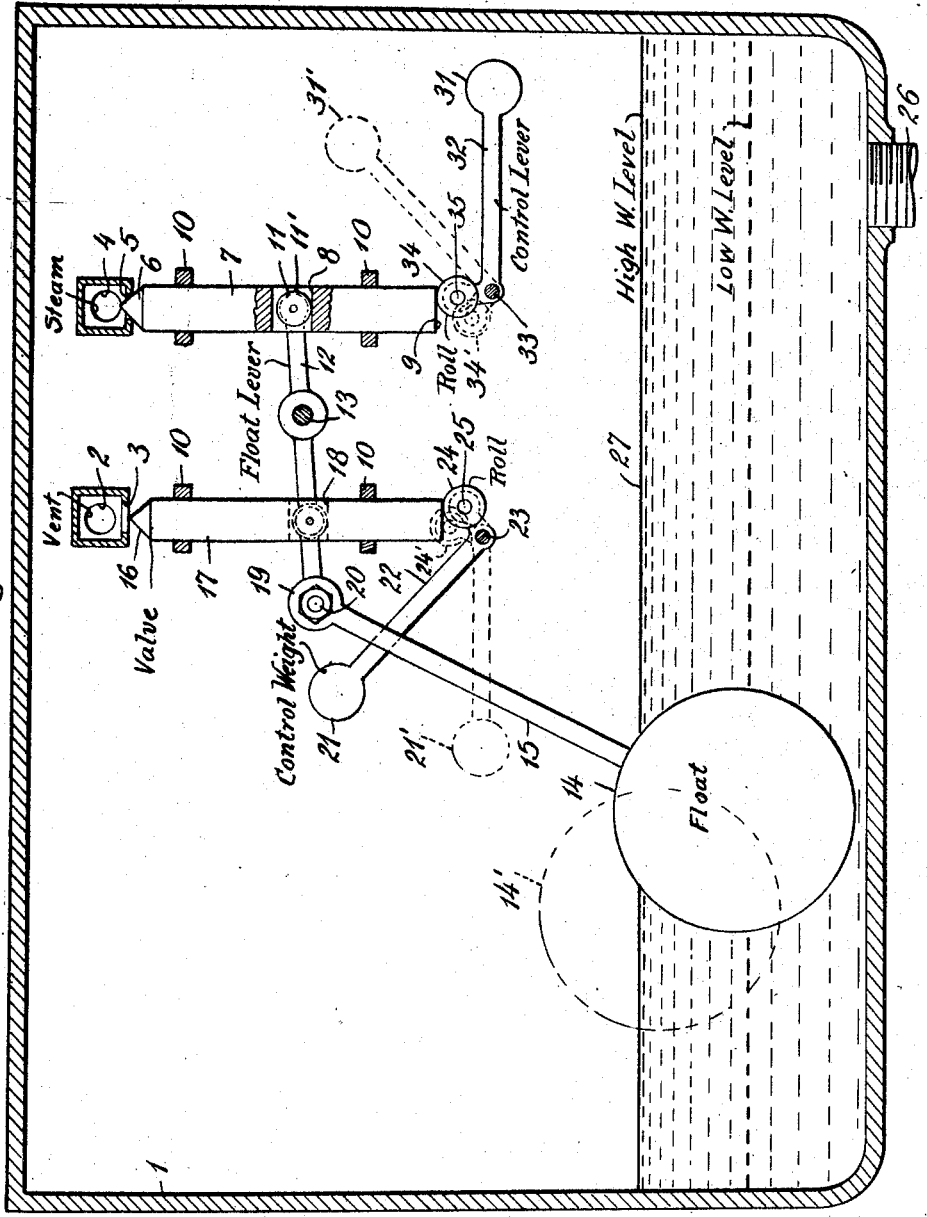

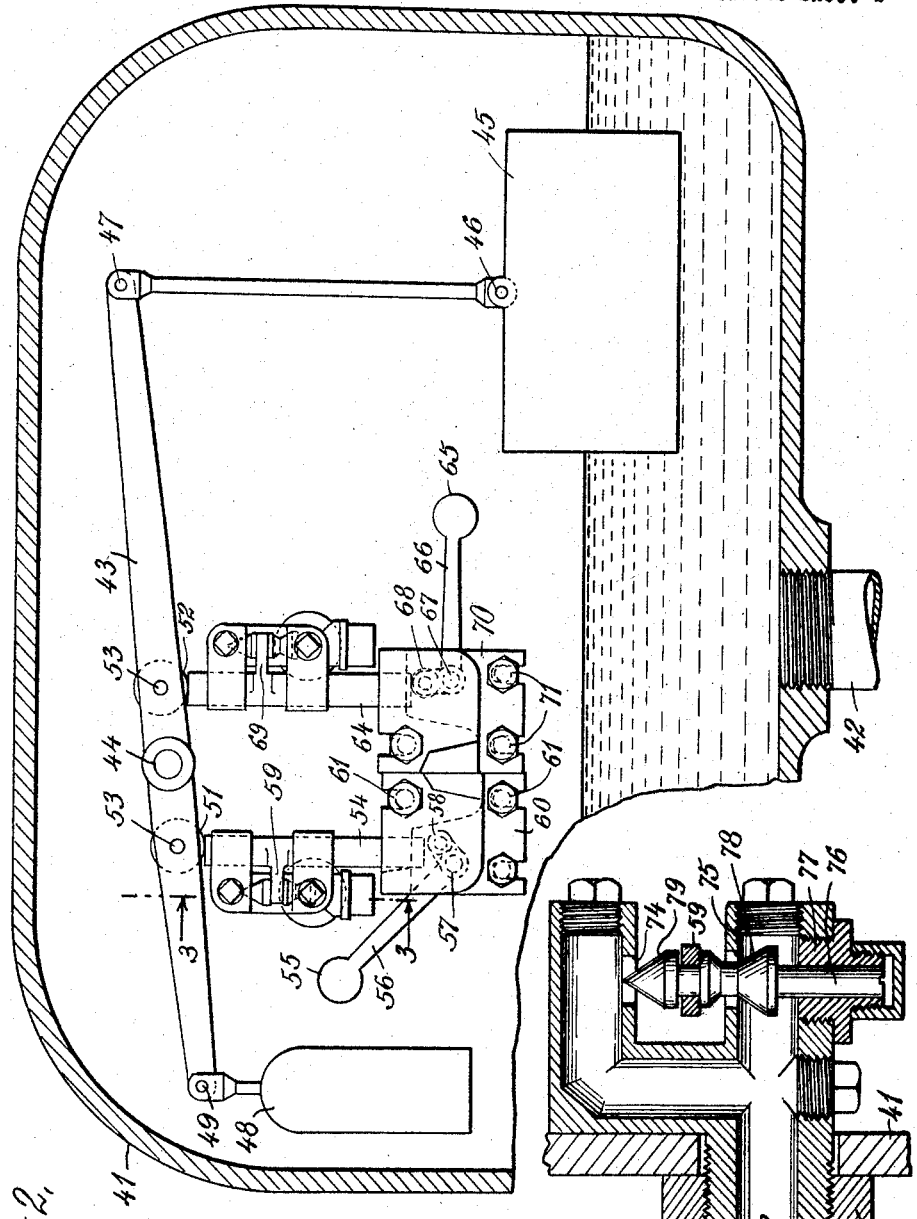

1,555,082

UNITED STATES PATENT OFFICE.

JOHN A. SERRELL, OF NORTH PLAINFIELD, NEW JERSEY.

FLOAT-VALVE DEVICE.

Application filed May 3, 1924. Serial No. 710,765.

*To all whom it may concern:*

Be it known that I, JOHN A. SERRELL, a citizen of the United States, and resident of North Plainfield, Somerset County, New Jersey, have made a certain new and useful Invention relating to Float-Valve Devices, of which the following is a specification, taken in connection with the accompanying drawings, which form part of the same.

This invention relates especially to float valve devices which may be used for boiler return or vent trap apparatus in low pressure steam heating plants for instance, or, if desired, the float devices may operate one or more valves in connection with open or pressure tanks or alternating discharge tanks where the tank automatically receives and discharges liquid under substantially definite pressures or water level conditions. The float device of any suitable size and construction may advantageously be pivotally mounted in many cases and may have associated with the float one or more controlling weights so as to restrain the usual creeping movement of the float device; and then when movement starts, to promote the prompt operation of the float device when the water reaches or approaches the desired high or low water levels. For this purpose one or more controlling weights may be operatively connected with the float or float lever so as to exert a variable turning movement which may, for example, resist the initial movement of the float so as to restrain it and in connection with the float tend to hold the float device in each extreme position; while by the varying amount or changing sign of this turning moment of the float or the one or more controlling weights the movement of the float device in either direction is retarded to a less and less extent and may even be assisted or accelerated after its movement begins by the controlling weight used in connection with the float, which preferably has in its lower position for instance sufficient potential buoyant energy at the high water level to complete the stroke. This is of decided advantage in minimizing the creeping tendency of the float device and making its operation more prompt and reliable after it starts from an extreme position so that there is correspondingly less danger of the float device hanging or sticking in an intermediate position where it may not properly operate the valves.

In the accompanying drawing showing in a somewhat diagrammatic way various illustrative embodiments of this invention Fig. 1 is a sectional elevation showing an illustrative return trap for heating systems;

Fig. 2 is another illustrative device which may be used as a return or vent trap;

Fig. 3 is a detail section thereof taken substantially along the line 3—3 of Fig. 2.

In the illustrative embodiment of this invention shown in Fig. 1 a casing 1 of any desired construction may enclose the float device and cooperating valves which may include a vent valve to relieve the pressure in the casing and allow water or other liquid to enter the same and also a steam or pressure valve to admit pressure for expelling the accumulated water where necessary. As shown the vent connection 2 may be provided with a valve seat 3 and the steam or pressure connection 4 may have a similar valve seat 5 with which cooperates the valve 6 of any suitable construction. This valve on the stem 7 may be mounted to move in suitable guides 10 connected with the casing and the vent valve 16 on its stem 17 may move in similar guides. The float device may in this case comprise a float lever 12 pivoted about the pin 13 in the casing and having the float 14 connected thereto in any suitable way as by the float arm 15 which may have an angularly adjustable connection 19 with the lever arm so that these two parts may be securely held in any desired adjusted position by the bolt 20. The float lever 12 has one or more operating projections or circular contact portions 11 which may be in the form of anti-friction rolls 11', if desired, to cooperate with the one or more valve stems or devices which it operates and each of these valve stems may have a recess such as 8, 18 through which the lever extends so as to provide flat contact surfaces for these operating projections or anti-friction operating rolls. One or more controlling weights may be operatively connected to the float device in any suitable way so as to exert an initial restraining action on the float device tending to hold it in its extreme position, this restraining or holding action gradually decreasing as the float device moves so as to promote the prompt and reliable operation of the float and valve devices under operating conditions. As indicated, a control weight may be arranged to cooperate with one or both of the valve stems and, as indicated, the control weight 21 may be mounted on the rock arm 22 which may be pivoted about the pin 23 in the casing and have an anti-friction contact roll 24 mounted on the pin 25 so as to engage the lower end of the valve stem 17, for example. When the valve 16 is closed this control weight has swung down into its lower dotted position 21′ so as to have a maximum lever arm, while because of the toggle action of the short arm of this rock lever the upward force tending to hold the valve closed is also a maximum at that time, and the restraining action tending to prevent movement of the float is thus greatest and gradually decreases as the float and valve devices move so as to carry the control weight up into the full line position 21, for example. It is not necessary in all cases, however, to have two valves operated by the float device and in some cases a single valve may be arranged on the valve stem 7 to open in either direction and operate a vent or pressure or other connection such as an inlet valve supplying liquid to the chamber or tank. Under these conditions a single control weight such as 31 may be used on the rock lever 32 pivoted about the pin 33 in the casing and carrying the contact roll 34 on the pin 35 arranged at any suitable angle to the arm 32 of this control lever so as to exert a maximum initial restraining or closing moment on the bottom 9 of the valve stem 7. This is because in its full line position the lever arm of the control weight 31 is considerably greater than in the dotted line or raised position 31′ of this control weight, which corresponds to the dotted line position 34′ of the contact roll where the roll's effective lever arm is shorter, so that the upward pressure is considerably increased when the roll moves from the dotted to full line position. During this movement the float lever 12 and connected float 14 have moved so that the float moves up into its dotted line position 14′ where it is correspondingly further to the left of its pivot 12 so that it exerts a greater turning moment about this pivot. The result is that as the water first rises the float device under these conditions may be held substantially stationary through the initial restraining action of the control weight 31 until the water substantially or entirely reaches the high water level diagrammatically indicated in Fig. 1 thus storing up in the float sufficient buoyant potential energy to operate the float device and then, when the float device begins to rise, its buoyant force and lever arm and turning moment of the float decreases at a less rapid rate than the restraining action of the control weight decreases, so that the movement may be accelerated and a single rapid movement of the float device may take place from substantially its extreme lower to its extreme upper position. This is of course of decided advantage in ensuring the reliable operation of the connected valve or valves and in preventing sticking or hanging of the float device or valves in intermediate positions. Of course when the valve or valves have operated the water may be forced out of the casing through the pipe or passage 26, which may connect through the usual check valves with the drip return and with the boiler connection where the device is used in connection with a low pressure steam heating system for example. As the water level falls the buoyancy of the float may hold the float device stationary until the water level has substantially reached the low water line which may be about as indicated diagrammatically in Fig. 1; then the action of the control weight and the unsupported weight of the float may start its downward movement; and as soon as this downward movement begins, the upward pressure of the control weight on the valve stem 7 increases and accelerates the movement as the control weight moves downward from its dotted line position 31′, so that a single quick downward movement of the float device can thus be ensured, because as soon as the downward movement of the float begins its restraining action may decrease in relation to the much more rapidly increasing operating force of the control weight.

Fig. 2 shows another illustrative arrangement which may be used for a return trap for steam heating systems etc. The float lever 43 may be pivoted about the pin 44 in the casing 41 and may have mounted thereon in any suitable way the float 45 which may have an arm or stem pivoted to the float lever by the pin 47 and to the float by the pin 46, if desired. A counterweight such as 48 of desired size may be pivoted to the other end of the float lever by the pin 49 so as to give the float the desired buoyancy in the liquid in the chamber which may enter and be discharged through the pipe 42. The float lever may be provided with anti-friction operating rolls 51, 52 mounted on the pins 53 so as to cooperate with the valve rods 54, 64 mounted in suitable guides secured to the casing and these rods and guides, together with the cooperating valves may be removably mounted in the casing as is shown more in detail in Fig. 3. The hollow stems 72 of the steam or vent passages may be threaded and securely held in the holes in the casing 41 by one or more lock nuts such as 73 which rigidly hold these parts in position and at the same time provide for their convenient removal and repair when necessary. Where balanced valves are used the two valves 78, 79 may be arranged on a single valve stem 76 engaged by the fork 59 on the cooperating valve rod 54 so as to move the valve into desired position with respect to the valve seats 74, 75. The valve stem may, if desired, be guided in the bushing 77 which preferably allows sufficient play of the valve so that it can seat accurately in connection with the two valve seats. The other valve rod 64 may be provided with a similar operating fork 69 so as to operate a similarly constructed vent valve, for instance, which may thus be opened at intervals by the float lever alternately with the steam or pressure valve described in detail. One or more control weights may cooperate with these valve rods or stems and as indicated in Fig. 2, it is advantageous in some cases to have these control weights adjustably mounted with respect to the valve rods, as by mounting the control devices on adjustable supports or plates 60, 70 which may be bolted to the casing in any desired adjusted position as by the bolts 61, 71. A control weight such as 55 may be mounted on a control lever 56 pivoted about the pin 57 in the support 60 and carrying the angularly arranged operating roll 58 which exerts a variable upward pressure on the valve rod 54. The other control weight 65 on its lever 66 may be pivoted about the pin 67 in the support 70 and have a similar operating roll 68 engaging the lower end of the other valve rod 64. Of course only one set of valves and control weights and levers need be used in some cases, and the action of this Fig. 2 device is generally similar to what has been described in detail in connection with Fig. 1.

This invention has been described in connection with a number of illustrative arrangements, parts, proportions, materials, sizes and connections, and methods of operation and use, to the details of which disclosure the invention is not of course to be limited, since what is claimed as new and what is desired to be secured by Letters Patent is set forth in the appended claims.

1. The steam return trap device, comprising a casing having pivotally mounted therein a float lever provided on one end with an adjustably connected depending float, an operating contact on each side of the pivot of said float lever, a pair of vertically movable valve stems mounted in guides in said casing and each formed with a transverse recess to be engaged by one of said operating contacts, a pair of valve seats in said casing and cooperating valves connected to said valve stems, a control weight and a connected control lever pivoted in said casing below the end of each of said valve stems and carrying an angularly arranged upwardly extending operating roll engaging the lower end of the adjacent valve stem to have a maximum lifting restraining action thereon when said valve stem is in raised position tending to keep said float lever stationary until the water level in said casing has substantially reached the other extreme water level therein, the restraining action of said control weight decreasing as said float lever moves to promote a prompt movement of said float device.

2. The steam return trap device, comprising a casing having pivotally mounted therein a float lever provided on one end with a depending float, an operating contact on each side of the pivot of said float lever, a pair of vertically movable valve stems mounted in guides in said casing and each formed to be engaged by one of said operating contacts, a pair of valve seats in said casing and cooperating valves connected to said valve stems, a control weight and a connected control lever pivoted in said casing below the end of each of said valve stems and carrying an angularly arranged upwardly extending operating portion engaging the adjacent valve stem to have a maximum lifting restraining action thereon when said valve stem is in raised position tending to keep said float lever stationary until the water level in said casing has substantially reached the other extreme water level therein, the restraining action of said control weight decreasing as said float lever moves to promote a prompt movement of said float device.

3. The float valve device adapted for steam return traps etc., comprising a casing having pivotally mounted therein a float lever provided with a float at one end, an operating contact on each side of the pivot of said float lever, a pair of movable valve stems mounted in guides in said casing and formed to be engaged by said operating contacts, valve seats in said casing and cooperating valves connected with said valve stems, and a cooperating pair of control devices arranged to have a maximum restraining action on said valve stems to keep said float lever in an extreme position until the water level in said casing has substantially reached the other extreme water level therein, the restraining action of said control devices decreasing as said float moves to promote a prompt movement of said float device past its central position.

4. The float valve device, comprising a casing having pivotally mounted therein a float lever provided with a float, an operating contact on each side of the pivot of said float lever, a pair of movable valve stems mounted in said casing and formed to be moved by said operating contacts, valve seats in said casing and cooperating valves connected with said valve stems and a cooperating control device arranged to keep said float lever in an extreme position until the water level in said casing has substantially reached the other extreme water level therein, the restraining action of said control device decreasing as said float moves to promote a prompt movement of said float device past its central position.

5. The float valve device comprising a closed casing having pivotally mounted therein a float lever provided on one end with an adjustably connected depending float, an operating contact on the other end of said float lever beyond its pivot, a vertically movable valve stem mounted in guides in said casing and formed with a transverse recess to be engaged by said operating contact, a valve seat in said casing and a cooperating valve connected with said valve stem, a control weight and a connected control lever pivoted in said casing below the end of said valve stem and carrying an angularly arranged upwardly extending operating anti-friction member engaging said valve stem to have a maximum lifting restraining action thereon when said valve stem is in raised position tending to keep said float in its lower position until the water level in said casing has substantially reached the extreme high water level therein, the restraining action of said control weight decreasing as said float moves upward to effect a prompt upward movement of said float device and ensure said float remaining in its upper position until the water level in said casing has dropped substantially toward the lower water level therein.

6. The float valve device, comprising a closed casing having pivotally mounted therein a float lever provided on one end with a connected depending float, an operating contact on said float lever beyond its pivot, a vertically movable valve stem to be engaged by said operating contact, a valve seat in said casing and a cooperating valve connected with said valve stem, a control weight and a connected control lever pivoted in said casing and carrying an angularly arranged upwardly extending operating member engaging said valve stem to have a maximum lifting restraining action thereon when said valve stem is in raised position tending to keep said float in its lower position until the water level in said casing has substantially reached the extreme high water level therein, the restraining action of said control weight decreasing as said float moves upward to effect a prompt upward movement of said float device.

7. The float valve device, comprising a pivotally mounted float lever having a connected float depending below the pivot of said float lever, an operating contact on said float lever, a vertically movable valve stem connected with said operating contact, a valve seat and a cooperating valve connected with said valve stem, a control weight and a connected control lever carrying an angularly arranged upwardly extending operating member engaging said valve stem to have a lifting restraining action thereon when said valve stem is in raised position tending to keep said float in its lower position until the liquid level in said casing has substantially reached the other extreme level therein, the restraining action of said control weight decreasing as said float lever moves upward to effect a prompt movement of said float device and valve.

8. The float valve device, comprising a pivotally mounted float lever having a connected float, an operating contact on said float lever, a movable valve stem connected with said operating contact, a valve seat and a cooperating valve connected with said valve stem, a control weight and a connected control lever carrying an angularly arranged operating member engaging said valve stem to have a restraining action thereon tending to keep said float in its lower position until the liquid level in said casing has substantially reached the other extreme level therein, the restraining action of said control weight decreasing as said float lever moves upward to effect a prompt movement of said float device and valve.

9. The float valve device, comprising a pivotally mounted float lever having a connected float, an operating contact on said float lever, a movable valve stem connected with said operating contact, a valve seat and a cooperating valve connected with said valve stem, a control weight and a connected control lever carrying an angularly arranged operating member engaging said valve stem to have a restraining action thereon tending to keep said float lever in an extreme position until the liquid level in said casing has substantially reached the other extreme level therein, the restraining action of said control weight decreasing as said float lever moves upward to effect a prompt movement of said float device and valve.

10. The float valve device, comprising a float lever and a rigidly connected float, a movable valve stem operated by said float lever, a valve seat and a cooperating valve connected with said valve stem, an operatively connected control weight to have a maximum leverage restraining action to keep said float in its lower position until the liquid level in said casing has substantially reached a considerably higher level therein and the float has acquired sufficient buoyant potential energy to complete the valve operating movement, the restraining action of said control weight decreasing as said float first moves upward to effect a prompt movement of said float and valve.

11. The float valve device, comprising a closed casing having pivoted therein a float lever and a connected float, a movable valve stem operated by said float lever, a valve seat and a cooperating valve connected with said valve stem, a connected control weight to keep said float in its lower position until the liquid level in said casing has substantially reached its extreme high level therein and the float has acquired sufficient buoyant potential energy to complete the valve operating movement, the restraining action of said control device continuously decreasing as said float moves upward to effect a prompt movement of said float and valve.

12. The float valve device, comprising a closed casing having pivoted therein a float lever and a rigidly connected float, a movable valve stem operated by said float lever, a valve seat and a cooperating valve connected with said valve stem, and a connected control weight to keep said float in its lower position until the liquid level in said casing has substantially reached its extreme high level therein and the float has acquired sufficient buoyant potential energy to complete the valve operating movement.

13. The float valve device, comprising a float lever and a rigidly connected float, a movable valve stem operated by said float lever, a valve seat and a cooperating valve connected with said valve stem, and an operatively connected control weight to have a restraining action keeping said float in its lower position until the liquid level in said casing has substantially reached a considerably higher level therein and the float has acquired sufficient buoyant potential energy to complete the valve operating movement.

14. The float valve device adapted for steam return traps etc. and comprising a float and an operatively connected controlling weight forming a float device, a valve and operating connections between said valve and float device, said controlling weight exerting a powerful initial restraining action on said float device and exerting a gradually decreasing restraining action as said float device first moves upward to effect the prompt and accelerated movement of said float device.

15. The float valve device comprising a casing having pivotally mounted therein a float lever and connected depending float, a control device operatively connected to said float forming a float device, a valve in said casing and operating connections between said float device and said valve to enable said float device to operate said valve, said float and control device exerting a mutually restraining action holding said float device stationary in each extreme position and said restraining action gradually and continuously decreasing in relation to the operating force as the float device moves to effect the acceleration of such movement.

16. The float valve device comprising a casing having pivotally mounted therein a float lever and connected float, a control weight operatively connected to said float forming a float device, a valve in said casing and operating connections between said float device and said valve to enable said float device to operate said valve, said control weight exerting a restraining action holding said float device stationary in the lower extreme position of the float until its buoyant potential energy is sufficient to complete the valve operating movement of the float device and said restraining action gradually decreasing in relation to the buoyant operating force of the float as the float device first moves to effect the acceleration of such movement.

JOHN A. SERRELL.